United States Patent
Suganama

(10) Patent No.: US 8,763,419 B2
(45) Date of Patent: Jul. 1, 2014

(54) MOTOR-OPERATED VALVE AND REFRIGERATION CYCLE USING THE SAME

(75) Inventor: Takeshi Suganama, Tokyo (JP)

(73) Assignee: Fujikoki Corporation, Tokyo (JP)

( * ) Notice: Subject to any disclaimer, the term of this patent is extended or adjusted under 35 U.S.C. 154(b) by 1114 days.

(21) Appl. No.: 12/662,354

(22) Filed: Apr. 13, 2010

(65) Prior Publication Data

US 2010/0263397 A1 Oct. 21, 2010

(30) Foreign Application Priority Data

Apr. 16, 2009 (JP) ................................. 2009-100097
Apr. 16, 2009 (JP) ................................. 2009-100103

(51) Int. Cl.
| | | |
|---|---|---|
| F25B 13/00 | (2006.01) | |
| F25B 41/06 | (2006.01) | |
| F16K 15/00 | (2006.01) | |
| F16K 31/02 | (2006.01) | |

(52) U.S. Cl.
USPC ............. 62/324.6; 62/160; 62/324.1; 62/527; 62/528; 236/92 B; 137/601.2; 137/601.21; 137/601.14; 251/129.11; 251/129.12; 251/129.13

(58) Field of Classification Search
USPC .......... 62/160, 238.3, 324.1, 324.6, 527, 528; 137/601.2, 601.21, 601.14; 251/129.11, 129.12, 129.13; 236/92 B
See application file for complete search history.

(56) References Cited

U.S. PATENT DOCUMENTS

| | | | | |
|---|---|---|---|---|
| 3,919,858 A | * | 11/1975 | Garland et al. | ................ 62/527 |
| 4,009,592 A | * | 3/1977 | Boerger | .......................... 62/527 |
| 4,184,537 A | * | 1/1980 | Sauder | ........................ 62/324.6 |
| 4,263,787 A | * | 4/1981 | Domingorena | ............. 62/324.6 |
| 4,311,020 A | * | 1/1982 | Tobin et al. | .................. 62/324.6 |
| 4,852,364 A | * | 8/1989 | Seener et al. | ................ 62/324.1 |
| 5,025,640 A | * | 6/1991 | Drucker | ....................... 62/324.6 |
| 5,165,254 A | * | 11/1992 | Kountz et al. | ................ 62/324.6 |

(Continued)

FOREIGN PATENT DOCUMENTS

| | | |
|---|---|---|
| CN | 101338835 A | 1/2009 |
| JP | 61-186072 U | 11/1986 |

(Continued)

OTHER PUBLICATIONS

Office Action from the Japanese Patent Office in the corresponding Japanese Patent Application No. 2009-100097, dated Jan. 22, 2013, 2 pages in Japanese.

*Primary Examiner* — Ljiljana Ciric
(74) *Attorney, Agent, or Firm* — Juan Carlos A. Marquez; Morris, Manning & Martin, LLP

(57) ABSTRACT

A motor-operated valve configured to control the flow rate during a normal flow and pass the fluid so as to minimize pressure loss during a reverse flow, and a refrigeration cycle using the same, are provided. It is configured such that during a normal flow, the fluid is made to flow only from between the main valve member and the orifice to perform flow rate control, and during a reverse flow, all or a majority of the fluid is made to flow to a bypass channel without being passed through the orifice to decrease pressure loss as much as possible. A check valve member which closes the bypass channel during a normal flow and opens it during a reverse flow is provided in the valve main body.

6 Claims, 9 Drawing Sheets

(56) References Cited

U.S. PATENT DOCUMENTS

| | | | |
|---|---|---|---|
| 5,170,638 A * | 12/1992 | Koenig et al. | 62/528 |
| 5,507,468 A * | 4/1996 | Evans | 62/324.6 |
| 5,718,125 A * | 2/1998 | Pfister et al. | 62/527 |
| 5,987,916 A * | 11/1999 | Egbert | 62/528 |
| 6,082,128 A * | 7/2000 | Lake et al. | 62/324.6 |
| 6,192,976 B1 * | 2/2001 | Yoshida et al. | 62/527 |
| 6,223,772 B1 * | 5/2001 | Cummings et al. | 251/129.11 |
| 6,314,747 B1 * | 11/2001 | Wightman | 236/92 B |
| 6,532,764 B1 * | 3/2003 | Hirota et al. | 62/527 |
| 6,751,974 B1 * | 6/2004 | Wiggs | 62/527 |
| 7,059,150 B2 * | 6/2006 | Komatsu et al. | 62/527 |
| 7,165,421 B2 * | 1/2007 | Tsugawa | 62/527 |
| 7,302,811 B2 * | 12/2007 | Nungesser et al. | 62/528 |
| 8,549,867 B2 * | 10/2013 | Crawford et al. | 62/160 |
| 2009/0020716 A1 | 1/2009 | Hokazono et al. | |

FOREIGN PATENT DOCUMENTS

| | | |
|---|---|---|
| JP | 63-162177 | 10/1988 |
| JP | 5-52452 U | 7/1993 |
| JP | 11-287344 | 10/1999 |
| JP | 2001-050415 | 2/2001 |
| JP | 2009-014056 | 1/2009 |
| JP | 2009-287913 | 12/2009 |

\* cited by examiner

FIG. 1
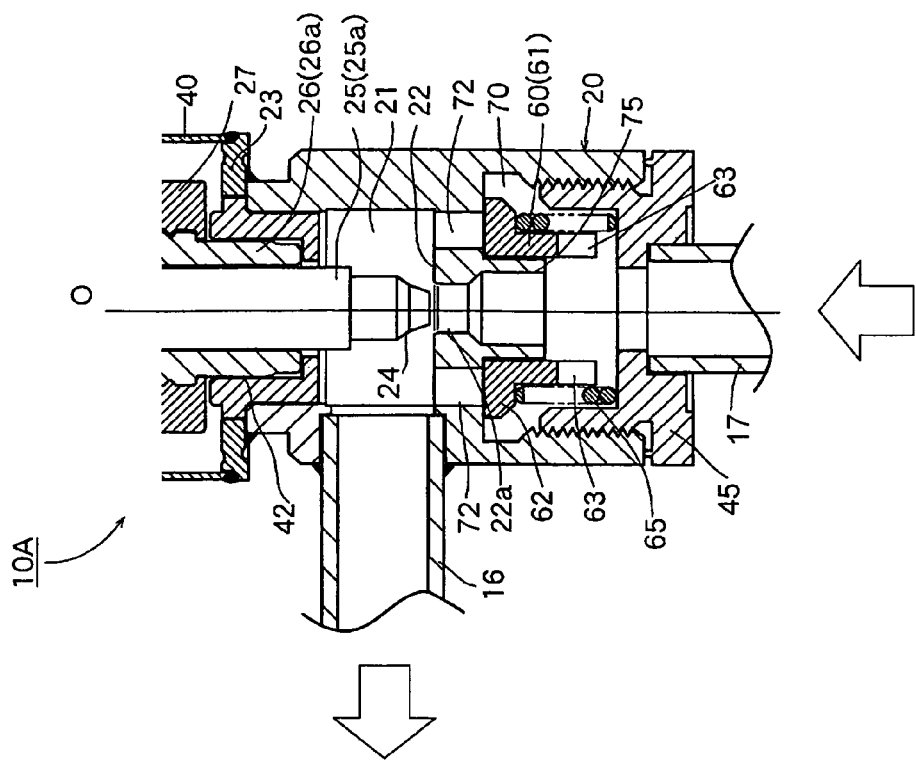
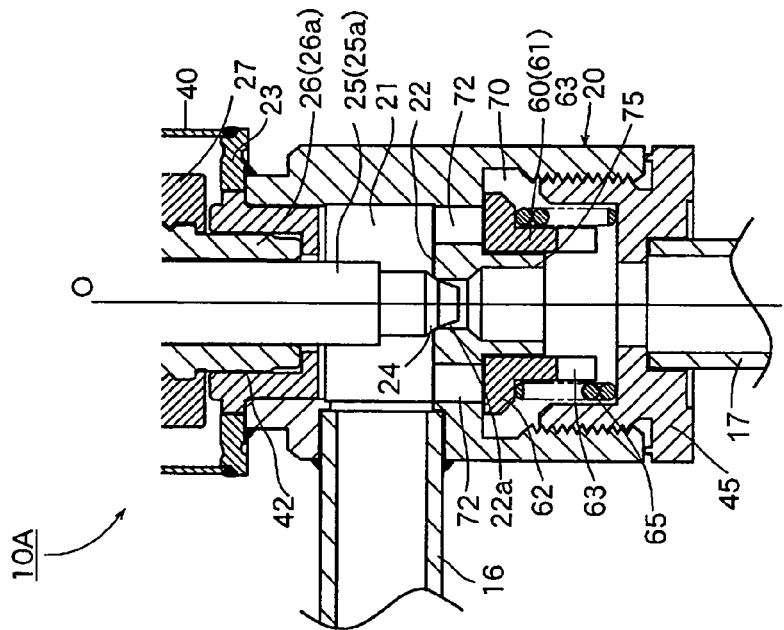

FIG. 2
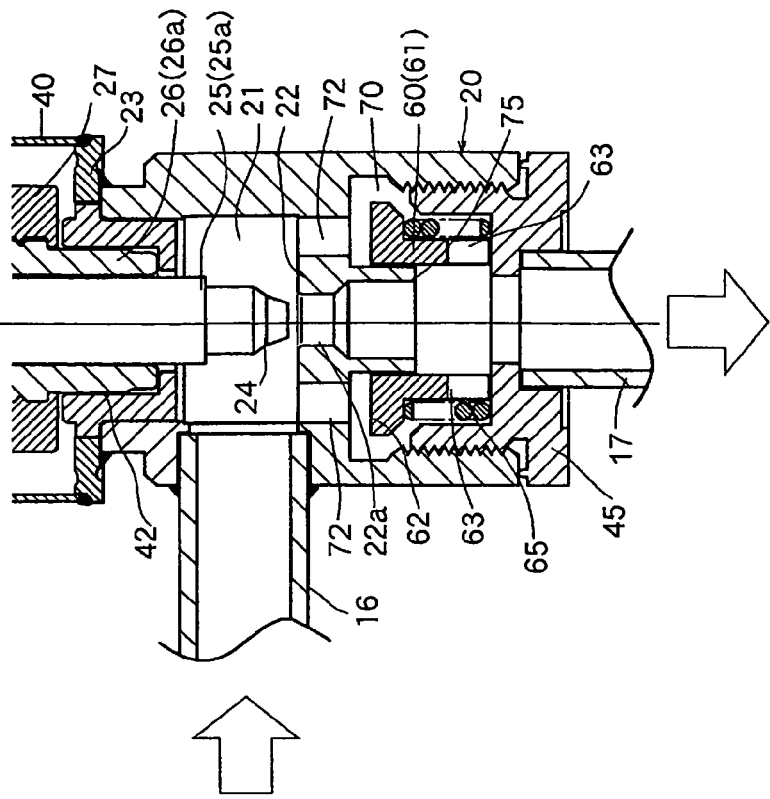
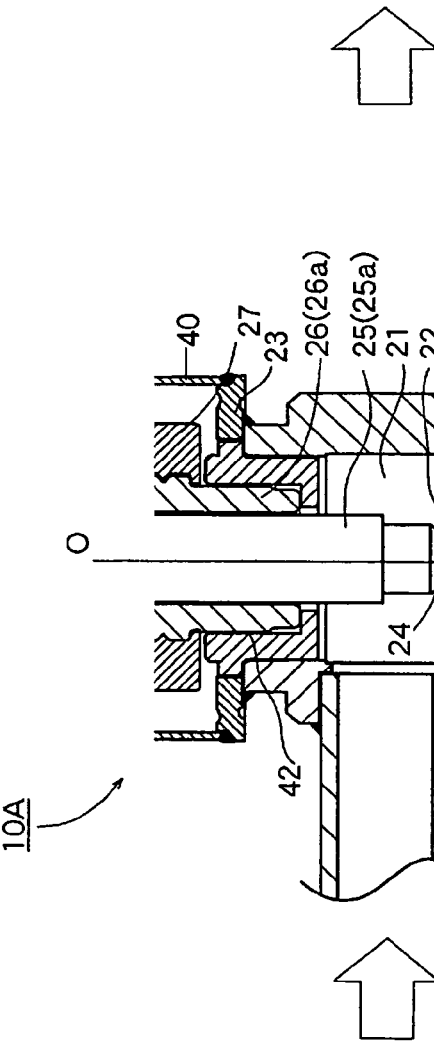

FIG. 3
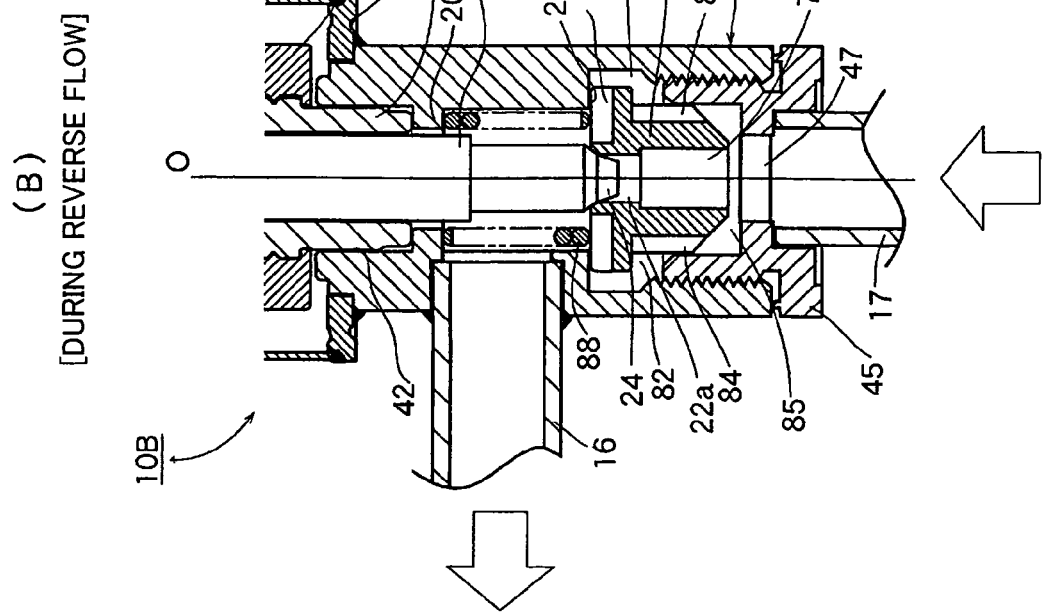
(A) [OUT OF SERVICE]
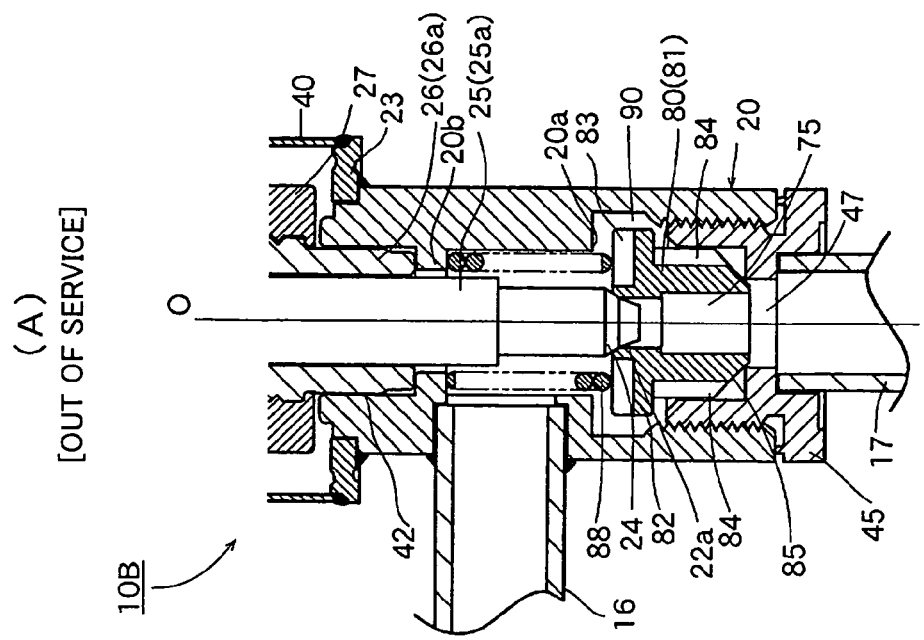
(B) [DURING REVERSE FLOW]

FIG. 5
[Refrigeration cycle of the present invention]
(a)
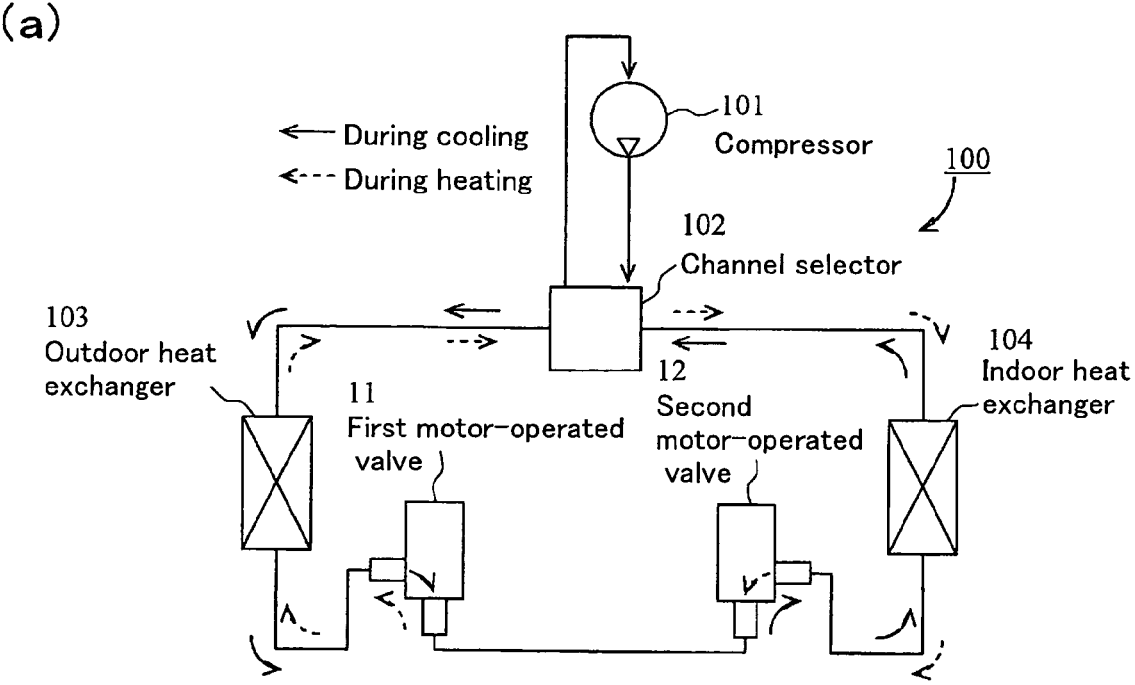
(b)
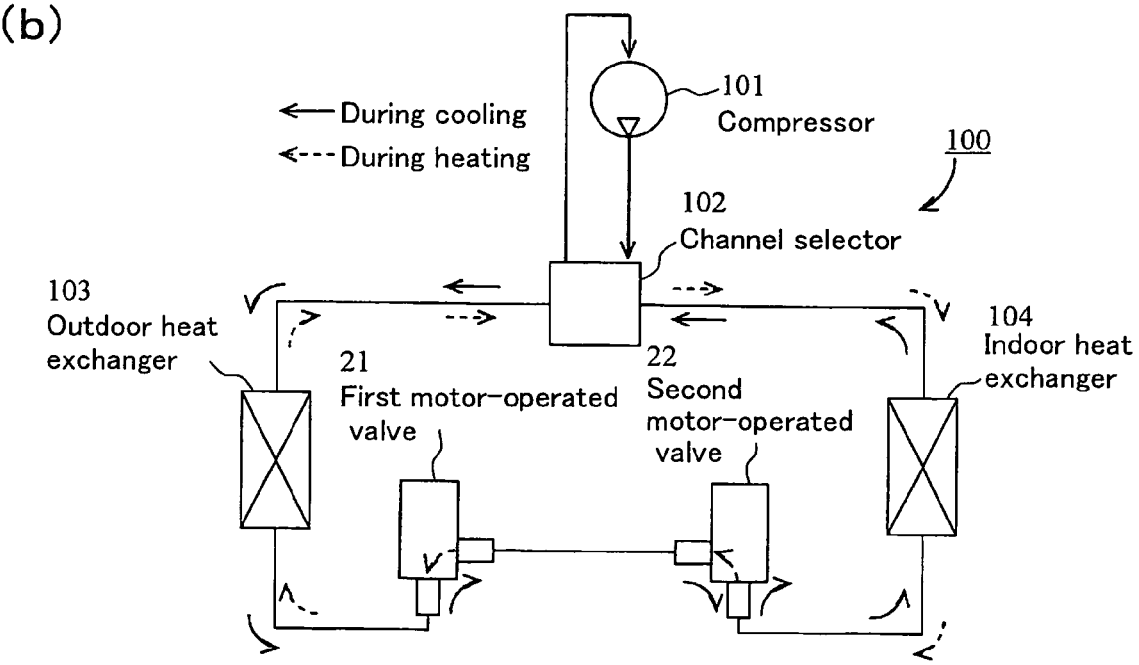

MOTOR-OPERATED VALVE AND REFRIGERATION CYCLE USING THE SAME

BACKGROUND OF THE INVENTION

1. Field of the Invention

The present invention relates to motor-operated valves which are used by being incorporated in an air conditioning apparatus etc., and particularly to a motor-operated valve which is configured such that when the fluid (refrigerant) flows in a normal direction, the flow rate can be controlled at a high accuracy by adjusting the lift amount of a valve body, and when the fluid flows in a reverse direction, the pressure loss can be decreased as much as possible.

2. Background Art

FIG. 6 shows an example of the refrigeration cycle that is adopted in an air conditioning apparatus. This refrigeration cycle 100 includes two expansion valves, one of which is in general sufficient, for improving the energy saving efficiency etc., in addition to a compressor 101, a channel selector 102, an outdoor heat exchanger (condenser) 103, and an indoor heat exchanger (evaporator) 104 (a distributor and others are not shown). That is, a first expansion valve 105 is disposed near the outdoor heat exchanger 103, and a second expansion valve 106 is disposed near the indoor heat exchanger 104. As the expansion valves 105 and 106, those of a temperature-sensitive type (a mechanical type) are used. Moreover, in order to reduce pressure loss as much as possible, a first and second check valves 108 and 109 are disposed in parallel with the first and second expansion valves 105 and 106, respectively.

In the refrigeration cycle 100, during cooling, the refrigerant gas which is compressed by the compressor 101 is introduced, as shown by a solid line arrow of the figure, from the channel selector 102 which is made up of, for example, a four-way valve, etc. into the outdoor heat exchanger 103 and therein exchanges heat with the outside air to condense, and this condensed refrigerant flows into the second expansion valve 106 through the first check valve 108 (and bypassing the first expansion valve 105) to undergo adiabatic expansion therein, and thereafter flows into the indoor heat exchanger 104 to exchange heat with the indoor air in the indoor heat exchanger 104 to evaporate, thereby cooling the indoor environment.

In contrast to that, during heating, the refrigerant gas which is compressed in the compressor 101 is introduced, as shown by a broken line arrow of the figure, from the channel selector 102 into the indoor heat exchanger 104 and therein exchanges heat with the indoor air to condense, thereby heating the indoor environment, and thereafter the refrigerant gas flows into the first expansion valve 105 through the second check valve 109 (and bypassing the expansion valve 106) to be decompressed therein, and is thereafter introduced into the outdoor heat exchanger 103 via a distributor to evaporate therein and return to the compressor 101.

In this way, the refrigeration cycle 100 is configured such that during a normal flow (during cooling), the refrigerant is led to the second expansion valve 106 through the first check valve 108 without being passed through the first expansion valve 105 to adjust the flow rate by the second expansion valve 106, and during a reverse flow (during heating), the refrigerant is led to the first expansion valve 105 through the second check valve 109 without being passed through the second expansion valve 106 to adjust the flow rate by the first expansion valve 105, so that pressure loss can be decreased as much as possible by incorporating the check valves 108 and 109 in parallel with the expansion valves 105 and 106, respectively.

By the way, recently in the refrigeration cycle 100 as described above, a study has been conducted to utilize an electronically controlled motor-operated valve, in which a lift amount, that is, an effective opening area of the orifice (valve opening) can be arbitrarily controlled, in place of the above described temperature-sensitive type (mechanical type) expansion valves 105 and 106 in order to further improve the energy saving efficiency, etc.

Hereafter, an example of the electronically controlled motor-operated valve will be described with reference to FIG. 9. The motor-operated valve 10' of the shown example includes: a valve stem 25 which includes a lower large-diameter part 25a and an upper small-diameter part 25b and in which a valve body 24 is integrally provided in the lower end part of the lower large-diameter part 25a; a valve main body 20 which is provided with a valve seat 22 formed with an orifice 22a with and from which the valve body 24 comes into contact and moves away, and which includes a valve chamber 21 to which conduits 16 and 17 are connected; a can 40 of which lower end part is sealingly jointed to the valve main body 20; a rotor 30 which is arranged in the inner periphery of the can 40 with a predetermined gap a therebetween; a stator 50 which is outwardly fitted to the can 40 so as to rotate the rotor 30; and a screw feed mechanism which is arranged between the rotor 30 and the valve body 24 and makes the valve body 24 come into contact with and move away from the orifice 22a by utilizing the rotation of the rotor 30, the motor-operated valve 10' being configured such that the through-flow rate of the refrigerant is controlled by changing the lift amount of the valve body 24 with respect to the orifice 22a.

The stator 50 is made up of a yoke 51, a bobbin 52, stator coils 53 and 53, and a resin mold cover 56, etc.; the rotor 30 and the stator 50 etc. make up a stepping motor; and the stepping motor and the screw feed mechanism, etc. make up an up-and-down drive mechanism for adjusting the lift amount of the valve body 24 with respect to the orifice 22a.

The rotor 30A is integrally coupled with a support ring 36, and onto the support ring 36, an upper projection part of the valve stem holder 32 which has a tubular form with a downward opening and is arranged in the outer peripheries of the valve stem 25 and a guide bush 26, is fixed by calking so that the rotor 30, the support ring 36, and the valve stem holder 32 are integrally connected.

The screw feed mechanism is made up of: a fixed screw part (a male screw part) 28 formed in the outer periphery of a tubular guide bush 26, of which lower end part 26a is fixedly press-fitted to the valve main body 20, and into which (the lower large-diameter part 25a of) the valve stem 25 is slidably inserted; and a movable screw part (a female screw part) 38 which is formed in the inner periphery of the valve stem holder 32 and is threaded into the fixed screw part 28.

Moreover, the upper small-diameter part 26b of the guide bush 26 is inserted into the upper part of the valve stem holder 32, and the upper small-diameter part 25b of the valve stem 25 is inserted through (a hole formed in) the center of the ceiling part 32a of the valve stem holder 32. A push nut 33 is fixedly press-fitted into the upper end part of the upper small-diameter part 25b of the valve stem 25.

Further, the valve stem 25 is fitted over the upper small-diameter part 25b of the valve stem 25, and is constantly urged downwardly (in the valve closing direction) by a valve-closing spring 34 made up of a compressed coil spring which is installed in a compressed state between the ceiling part 32a of the valve stem holder 32 and an upper terrace surface of the lower large-diameter part 25a in the valve stem 25. A return spring 35 made up of a coil spring is provided in the outer periphery of the push nut 33 on the ceiling part 32a of the valve stem holder 32.

A lower stopper body (a fixed stopper) 27 which makes up one of a rotational down-movement stopper mechanism for prohibiting further rotational down-movement of the rotor 30 when it is made to rotationally move downward up to a predetermined valve-closing position is fixedly attached to the guide bush 26, and an upper stopper body (a moving stopper) 37 which makes up the other of the stopper mechanism is fixedly attached to the valve stem holder 32.

It is noted that the valve-closing spring 34 is provided for the purpose of obtaining a desired sealing pressure (leakage prevention) in a valve closed state in which the valve body 24 is seated in the orifice 22a, and mitigating the impact when the valve body 24 comes into contact collidingly with the orifice 22a.

In the motor-operated valve 10' configured as described so far, as a result of an energization excitation pulse being supplied in a first mode to the stator coils 53 and 53, the rotor 30 and the valve stem holder 32 are rotated in one direction with respect to the guide bush 26 fixed to the valve main body 20, and for example, the valve stem holder 32 is moved downward by the screw feed between the fixed screw part 28 of the guide bush 26 and the movable screw part 38 of the valve stem holder 32 so that the valve body 24 is pressed against the orifice 22a causing the orifice 22a to be closed (a fully closed state).

At the time when the orifice 22a is closed, the upper stopper body 37 has not come into contact collidingly with the lower stopper body 27, the rotor 30 and the valve stem holder 32 further rotationally move down with the orifice 22a being closed by the valve body 24. In this case, since the valve stem holder 32 will move down although the valve stem 25 (valve body 24) will not, the valve-closing spring 34 will be compressed by a predetermined amount, resulting in that the valve body 24 is strongly pressed against the orifice 22, and the upper stopper body 37 comes into contact collidingly with the lower stopper body 27 due to the rotational down-movement of the valve stem holder 32, and that even when a pulse supply for the stator coils 53 and 53 is thereafter continued, the rotational down-movement of the valve stem holder 32 will be forcedly stopped.

On the other hand, an energization excitation pulse is supplied to the stator coils 53 and 53 in a second mode, the rotor 30 and the valve stem holder 32 will be rotated in opposite direction to that described above with respect to the guide bush 26 fixed to the valve main body 20, and then the valve stem holder 32 will be moved upward by the screw feed between the fixed screw part 28 of the guide bush 26 and the movable screw part 38 of the valve stem holder 32. In this case, at the start time of the rotational up-movement of the valve stem holder 32 (the start time of pulse supply), since the valve-closing spring 34 is compressed by a predetermined amount as described above, the valve body 24 will not move away from the orifice 22a thereby remaining to be in a valve closed state (the lift amount=0) until the valve-closing spring 34 expands by the above described predetermined amount. Then, when the valve stem holder 32 is made to rotationally move up further after the valve-closing spring 34 expands by the above described predetermined amount, the valve body 24 moves away from the orifice 22a so that the orifice 22a is opened and the refrigerant passes through the orifice 22a. In this case, the lift amount of the valve body 24, in other words, the effective opening area of the orifice 22a can be arbitrarily and finely adjusted by the amount of rotation of the rotor 30, and the amount of rotation of the rotor 30 is controlled by the number of supplied pulses, it is possible to control the flow rate of the refrigerant at a high accuracy (see JP Patent Publication (Kokai) Nos. 2001-50415A and 2009-14056A for details).

SUMMARY OF THE INVENTION

Even when the motor-operated valve 10' as described in the above refrigeration cycle 100 is adopted, there are problems to be solved as described below. That is, in the above described refrigeration cycle 100, since the configuration is made such that during a normal flow (during cooling), the refrigerant is led to the second expansion valve 106 through the first check valve 108 without being passed through the first expansion valve 105 so that the flow rate is adjusted by the second expansion valve 106; and during a reverse flow (during heating), the refrigerant is led to the first expansion valve 105 through the second check valve 109 without being passed through the second expansion valve 106 so that the flow rate is adjusted by the first expansion valve 105, it is absolutely necessary to incorporate the check valves 108 and 109 in parallel with the expansion valves 105 and 106, respectively; however, incorporating two check valves in the refrigerant circuit will cause an increase in the number of parts such as joints for that, and additional time and effort will be needed for piping connection works.

Then, the above describe JP Patent Publication (Kokai) No. 2009-14056A proposes a motor-operated valve which has both the functions of the above described expansion valve and the check valve, that is, a valve which is configured such that when the refrigerant is made to flow in one direction, the lift amount (effective opening area) is maximized to decrease pressure loss as much as possible, and when the refrigerant is made to flow in the other direction, the lift amount (effective opening area) is finely controlled within a predetermined range below a predetermined value to perform a flow rate control.

However, in such a proposed motor-operated valve, there is a problem that increasing the diameter of the orifice to decrease pressure loss will make it harder to perform flow rate control at a high accuracy.

The present invention has been made in view of the above described circumstances, and has its object to provide a motor-operated valve which during a normal flow, can control the flow rate at a high accuracy, and during a reverse flow, can pass the fluid so as to suppress pressure loss as much as possible, and a refrigeration cycle using the same.

In order to achieve the above described object, the motor-operated valve relating to the present invention primarily includes a main valve body, a valve main body which is provided with an orifice to be opened/closed by the main valve body, and an up-and-down movement driving mechanism comprising a rotor and a stator for adjusting the lift amount of the main valve body with respect to the orifice; in which during a normal flow, the fluid is made to flow only from between the main valve body and the orifice to perform flow rate control, and during a reverse flow, all or a majority of the fluid is made to flow without being passed through the orifice to decrease pressure loss as much as possible.

In a preferred mode, a channel for bypassing the orifice is formed in the valve main body, and a check valve body which closes the bypass channel during a normal flow and opens the bypass channel during a reverse flow is provided.

The check valve body is preferably arranged coaxially with the orifice.

In a preferred mode, a spring member which constantly urges the check valve body in the direction to close the bypass channel is provided.

In another preferred mode, a normal-flow channel forming part including a normal-flow channel in communication with the orifice is formed, and the check valve body is formed into a tubular form and is slidably fitted over the outer periphery of the normal-flow channel forming part, thereby forming a bypass channel on the outer periphery side of the check valve body.

The bypass channel is preferably configured to include a plurality of openings provided in the outer periphery side of the orifice in the valve main body, and such that the plurality of openings are opened/closed by a flange-like part provided in the check valve body.

In another preferred mode, an orifice which is opened/closed by the main valve body is formed in the check valve body.

In this case, preferably, the check valve body is formed into a tubular form, and a guide part into which the check valve body is slidably inserted is provided in the valve main body.

In another preferred mode, an inlet/outlet port which is used both for a normal-flow outlet port and a reverse-flow inlet port is provided in the valve main body, and during a normal flow, the check valve body shuts off between the inlet/outlet port and the bypass channel.

Another basic mode of the motor-operated valve relating to the present invention is characterized in that the check valve body is arranged at a position off-centered from the orifice.

In a preferred mode, a spring member which constantly urges the check valve body toward the direction to close the bypass channel is provided.

In another preferred mode, a normal-flow channel for passing fluid during a normal flow is formed coaxially with the orifice, and a valve-body housing part into which the check valve body is slidably fitted is formed adjacent to the normal-flow channel.

In a further preferred mode, the check valve body has a solid part which has a non-circular sectional shape, and the bypass channel is provided between the outer periphery surface of the solid part and the inner periphery surface of the valve-body housing part.

On the other hand, the refrigeration cycle relating to the present invention includes a compressor, a channel selector, an outdoor heat exchanger, and an indoor heat exchanger, in which a first expansion valve is disposed near the outdoor heat exchanger, and a second expansion valve is disposed near the indoor heat exchanger between the outdoor heat exchanger and the indoor heat exchanger; and is characterized in that the motor-operated valve is used as the first expansion valve and the second expansion valve, and when the refrigerant flows from the outdoor heat exchanger to the indoor heat exchanger, all or a majority of the refrigerant is made to flow without being passed through the orifice at the first expansion valve to decrease pressure loss as much as possible, and is made to flow only from between the main valve body and the orifice at the second expansion valve to perform flow rate control; when the refrigerant is made to flow from the indoor heat exchanger to the outdoor heat exchanger, all or a majority of the refrigerant is made to flow without being passed through the orifice at the second expansion valve to decrease pressure loss as much as possible, and the refrigerant is made to flow only from between the main valve body and the orifice at the first expansion valve to perform flow rate control.

In a preferred mode of the motor-operated valve relating to the present invention, since a channel for bypassing the orifice which is opened/closed by the main valve body is formed, and a check valve body which closes the bypass channel during a normal flow, and opens it during a reverse flow is provided so that during a normal flow, the fluid is made to flow only from between the main valve body and the orifice, and during a reverse flow, all or a majority of the fluid is made to flow to the bypass channel without being passed through the orifice, it becomes possible to perform flow rate control at a high accuracy during a normal flow and to reduce pressure loss to the same level as that of a flow in a conduit during a reverse flow.

Therefore, by using the motor-operated valve relating to the present invention for a refrigeration cycle as an expansion valve, it is possible to significantly improve the control accuracy in refrigeration cycle and to reduce pressure loss as much as possible resulting in a significant increase in energy saving efficiency. Further, since there is no need of separately arranging and connecting a check valve for the piping as in conventional examples, it is possible to suppress man-hours and costs needed for piping to a low level.

BRIEF DESCRIPTION OF THE DRAWINGS

FIG. 1 is a principal-part longitudinal sectional view to be used for description of the configuration and operation of a first example of the motor-operated valve relating to the present invention.

FIG. 2 is a principal-part longitudinal sectional view to be used for description of the configuration and operation of a first example of the motor-operated valve relating to the present invention.

FIG. 3 is a principal-part longitudinal sectional view to be used for description of the configuration and operation of a second example of the motor-operated valve relating to the present invention.

FIG. 5 shows an example of a refrigeration cycle in which the motor-operated valve relating to the present invention is used.

DESCRIPTION OF SYMBOLS 10A, 10B, 10C MOTOR-OPERATED VALVE
20 VALVE MAIN BODY
22 VALVE SEAT
22a ORIFICE
24 MAIN VALVE BODY
25 VALVE STEM
30 ROTOR
40 CAN
50 STATOR
60 CHECK VALVE BODY
70 BYPASS CHANNEL
80 CHECK VALVE BODY
90 BYPASS CHANNEL

DETAILED DESCRIPTION OF THE PREFERRED EMBODIMENTS

Hereafter, embodiments of the present invention will be described with reference to the drawings.

Figure 9:
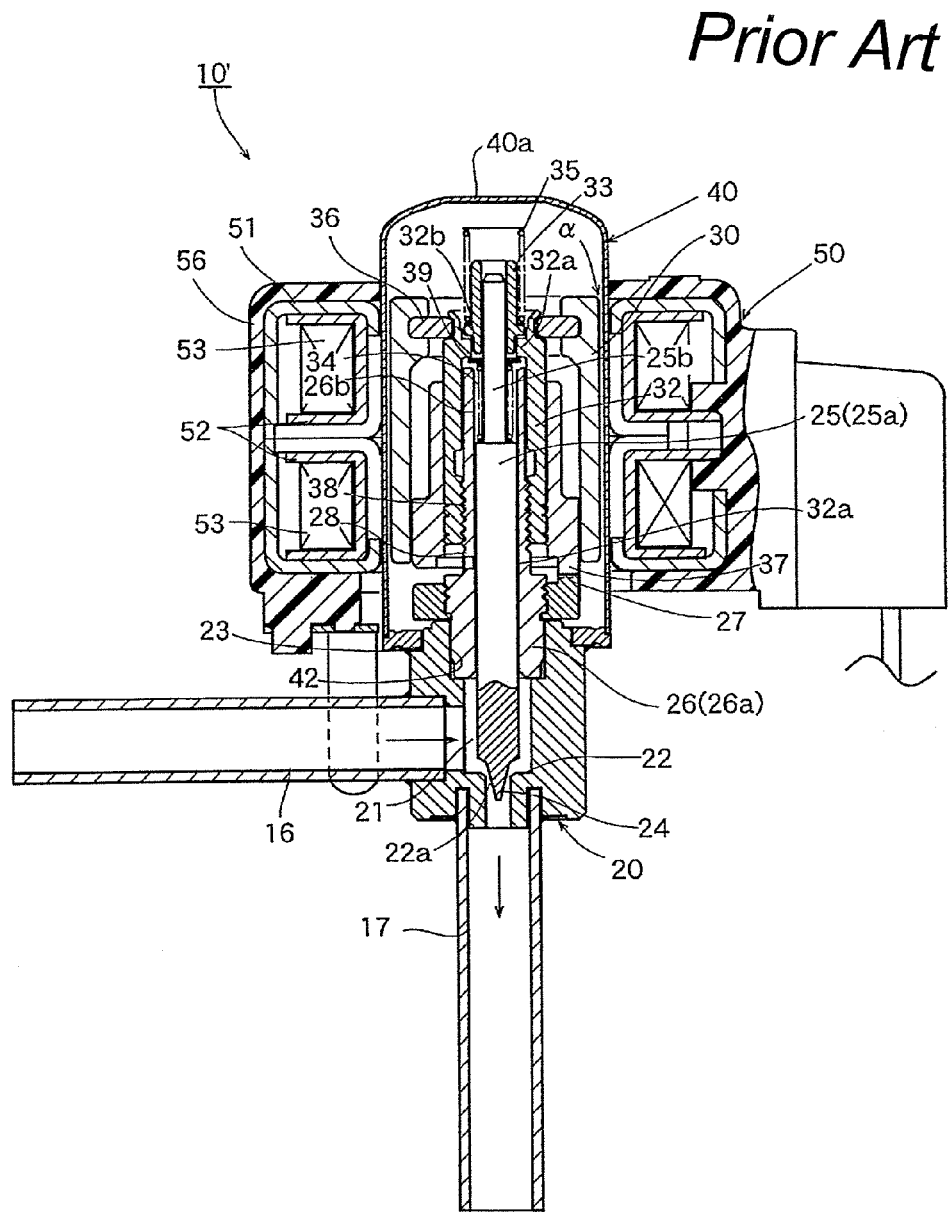
FIG. 9 is a longitudinal sectional view to show an example of a conventional motor-operated valve.

FIGS. 1(A) and 1(B), and FIGS. 2(A) and 2(B) are principal-part longitudinal sectional views of an embodiment (a first example) of the motor-operated valve relating to the present invention. Since the basic configuration of the motor-operated valve 10A of the shown example is substantially the same as that of the motor-operated valve 10' of the above described conventional example shown in FIG. 9, portions corresponding to each part of the motor-operated valve 10' of the conventional example shown in FIG. 9 is given the same reference characters to omit overlapping of description, and hereafter description will be made with emphasis placed on the valve main body 20 portion which is a principal part (characteristic portion).

The motor-operated valve 10A of the shown first example is configured such that during a normal flow as shown in FIG. 1(B), the refrigerant is made to flow only from between the main valve body 24 and the orifice 22a to perform flow rate control, and during a reverse flow as shown in FIGS. 2(C) and 2(D), all or a majority of the refrigerant is made to flow without being passed through the orifice 22a to decrease pressure loss as much as possible.

That is, a cap-type bottom member 45 is threaded into the lower-end opening part of the valve main body 20 to be sealed air-tightly; a conduit 17 is jointed to the cap-type bottom member 45 and a channel 70 for bypassing the orifice 22a is formed between the cap-type bottom member 45 and the valve seat 22; and a cylindrical check valve body 60 with a flange-like part 62 which closes the bypass channel 70 during a normal flow, and opens it during a reverse flow is provided coaxially with the orifice 22a (on the rotational axis line "O" of the rotor 30).

Specifically, a normal-flow channel forming part 75 including a normal flow channel in communication with the orifice 22a is formed in the lower side of the valve seat 22, and the check valve body 60 is slidably fitted over the outer periphery of the normal-flow channel forming part 75 in a slidable manner so that the bypass channel 70 is formed in the outer periphery side of the check valve body 60.

The bypass channel 70 is configured to include a plurality of openings 72, 72, . . . provided on the outer periphery side of the orifice 22a in the valve seat 22, and a plurality of openings 63 formed in lower part of the check valve body 60 so that the plurality of openings 72, 72, . . . are opened/closed by the upper surface of the flange-like part 62 provided in the check valve body 60.

Moreover, a coil spring 65 which constantly urges the check valve body 60 in the direction to close the bypass channel 70 (the plurality of openings 72, 72, . . . ) is mounted in a compressed state between the cap-type bottom member 45 and the flange-like part 62 of the check valve body 60.

In the motor-operated valve 10A of the first example which is configured as described above, the orifice 22a is closed by the main valve body 24 (the lift amount is 0) and the bypass channel 70 is also closed by the check valve body 60, during out of service as shown in FIG. 1(A).

During a normal flow, as shown in FIG. 1(B), the bypass channel 70 (the plurality of openings 72, 72, . . . ) is closed by the check valve body 60 and the main valve body 24 is lifted from the orifice 22a so that the refrigerant is introduced from the lower side conduit 17 into the valve main body 20 and is made to flow to the conduit 16 through between the main valve body 24 and the orifice 22a (with the flow being reduced).

Contrasting to that, during a reverse flow, as shown in FIG. 2(C), the orifice 22a is closed by the main valve body 24 and the check valve body 60 is pressed downwardly so that the bypass channel 70 is opened and the refrigerant is made to flow from the conduit 16 to the conduit 17 through the bypass channel 70. During this reverse flow, it may be configured such that the main valve body 24 is lifted to a maximum level as shown in FIG. 2(D) so that a part of the refrigerant is made to flow through the orifice 22a.

Thus, in the motor-operated valve 10A of the present embodiment, since the channel 70 which bypasses the orifice 22a which is opened/closed by the main valve body 24 is formed, and the check valve body 60 which closes the bypass channel 70 during a normal flow and opens it during a reverse flow is provided so that the refrigerant is made to flow only between the main valve body 24 and the orifice 22a during a normal flow, and all or a majority of the refrigerant is made to flow to the bypass channel 70 without being passed through the orifice 22a during a reverse flow, it becomes possible to perform flow rate control at a high accuracy during a normal flow and to reduce pressure loss to the same level as that of a flow in the conduit during a reverse flow.

Moreover, as a result of arranging the check valve 60 coaxially with the orifice 22a, it is possible to reduce the size of the valve main body 20 in the radial direction of the orifice 22a.

FIGS. 3(A) and 3(B) and FIGS. 4(C) and 4(D) are principal-part longitudinal sectional views of a second example of the motor-operated valve relating to the present invention. Here, since the basic configuration of the motor-operated valve 10B of the shown example is substantially the same as that of the motor-operated valves 10' and 10A shown in the above described FIGS. 9, 1, and 2, portions corresponding to each part of the motor-operated valves 10' and 10A are given the same reference characters to omit overlapping of description, and hereafter description will be made with emphasis placed on the valve main body 20 portion which is a principal part (characteristic portion).

Figure 4:
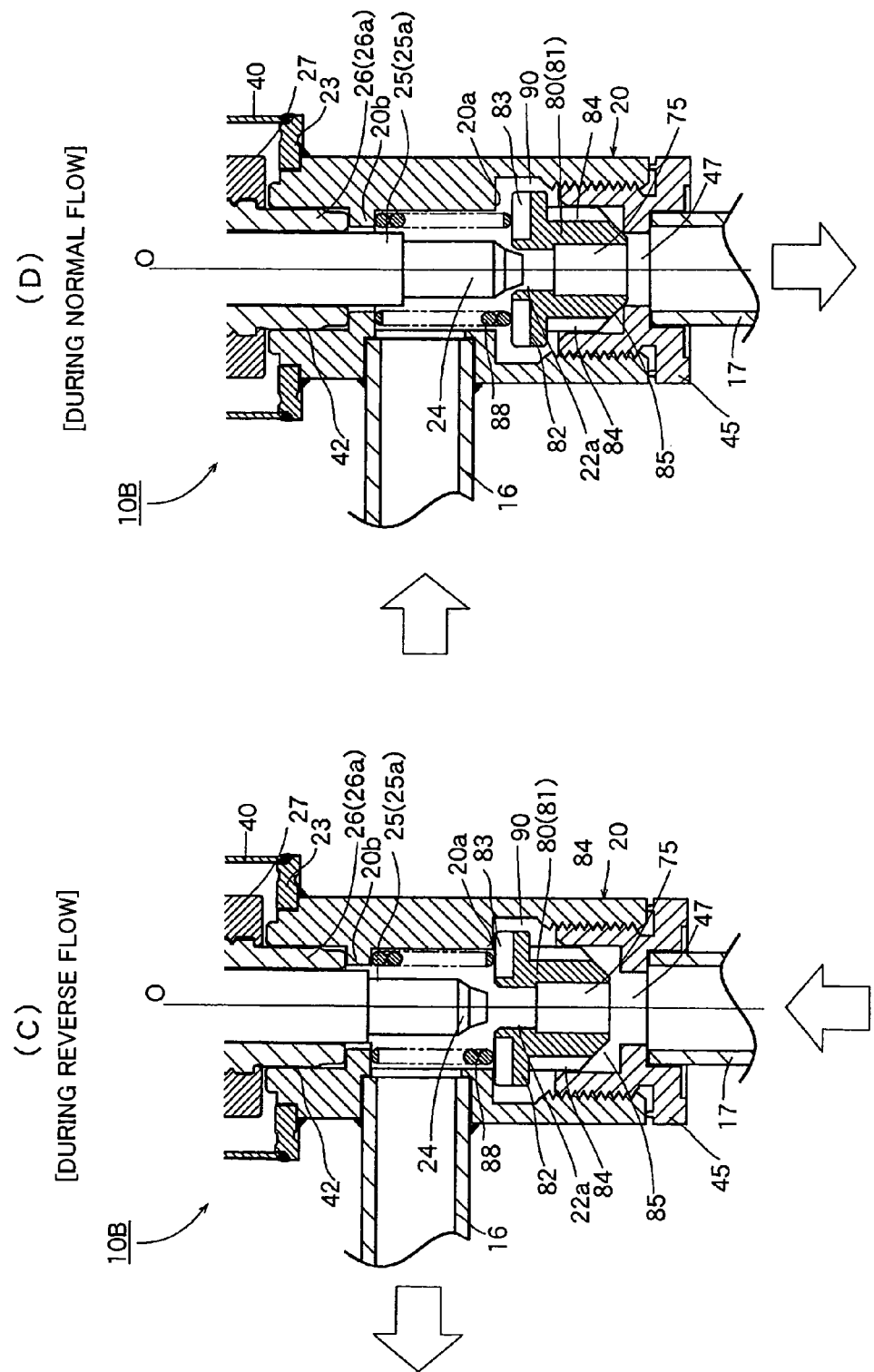
FIG. 4 is a principal-part longitudinal sectional view to be used for description of the configuration and operation of a second example of the motor-operated valve relating to the present invention.

The motor-operated valve 10B of the shown second example is configured such that an orifice 22a which is opened/closed by the main valve body 24 is formed in a check valve body 80 so that all or a majority of the fluid is made to flow without being passed through the orifice 22a to reduce pressure loss as much as possible during a reverse flow as shown in FIGS. 3(B) and 4(C), and the refrigerant is made to flow only from between the main valve body 24 and the orifice 22a during a normal flow as shown in FIG. 4(D).

That is, a cap-type bottom member 45 is threaded into the lower-end opening part of the valve main body 20 to be sealed air-tightly; a conduit 17 is jointed to the cap-type bottom member 45; a channel 90 for bypassing the orifice 22a is formed between the cap-type bottom member 45 and the central-opening end edge part 20a of the valve main body 20; and a cylindrical check valve body 80 with a flange-like part 82 which closes the bypass channel 90 during a normal flow, and opens it during a reverse flow is provided coaxially with the main valve body 24 (on the rotational axis line "O" of the rotor 30).

Specifically, the screw part 45a of the cap-type bottom part 45 serves as a guide into which the check valve body 80 is slidably inserted, and a plurality of openings 83 and 84 which are sectioned by a partition wall and make up part of the bypass channel 90 are formed on the upper part of the flange-like part 82 of the check valve body 80 and in the outer periphery of the cylindrical part.

Moreover, an inlet/outlet port 47 which are used both as a normal-flow outlet port and a reverse-flow inlet port is provided in the valve main body 20 (the cap-type bottom member 45) so that during a normal flow, the lower-end conical surface part 85 of the check valve body 80 shuts off between the inlet/outlet port 47 and the bypass channel 90.

A coil spring 88 which constantly urges the check valve body 80 in the direction to close the bypass channel 90 is mounted in a compressed state between the flange-like part 82 of the check valve body 80 and a ceiling-opening end edge part 20b of the valve main body 20.

In the motor-operated valve 10B of the second example which is configured as described above; during out of service as shown in FIG. 3(A), the orifice 22a is closed (the lift amount is 0) by the main valve body 24 and the bypass channel 90 is also closed by the check valve body 80.

During a reverse flow, as shown in FIG. 3(B), the check valve body 80 is pressed upwardly so that the orifice 22a is closed by the main valve body 24 and the bypass channel 90 is opened, and the refrigerant is made to flow from the conduit 17 to the conduit 16 through the bypass channel 90. During this reverse flow, it may be configured such that the main valve body 24 is lifted to a maximum level as shown in FIG. 4(C) so that a part of the refrigerant is made to flow through the orifice 22a.

Contrasting to that, during a normal flow, as shown in FIG. 4(D), the bypass channel 90 is closed by the check valve body 80 and the main valve body 24 is lifted from the orifice 22a so that the refrigerant is introduced from the conduit 16 into the valve main body 20 and is made to flow to the conduit 17 through between the main valve body 24 and the orifice 22a (with the flow being reduced).

In the motor-operated valve 10B of the second example which is configured as described above as well, substantially the same effects as those of the first example can be obtained.

Moreover, in the present example, as a result of forming an orifice 22a in the check valve body 80, it is possible to reduce the number of parts compared with the first example thereby allowing for cost reduction.

Figure 6:
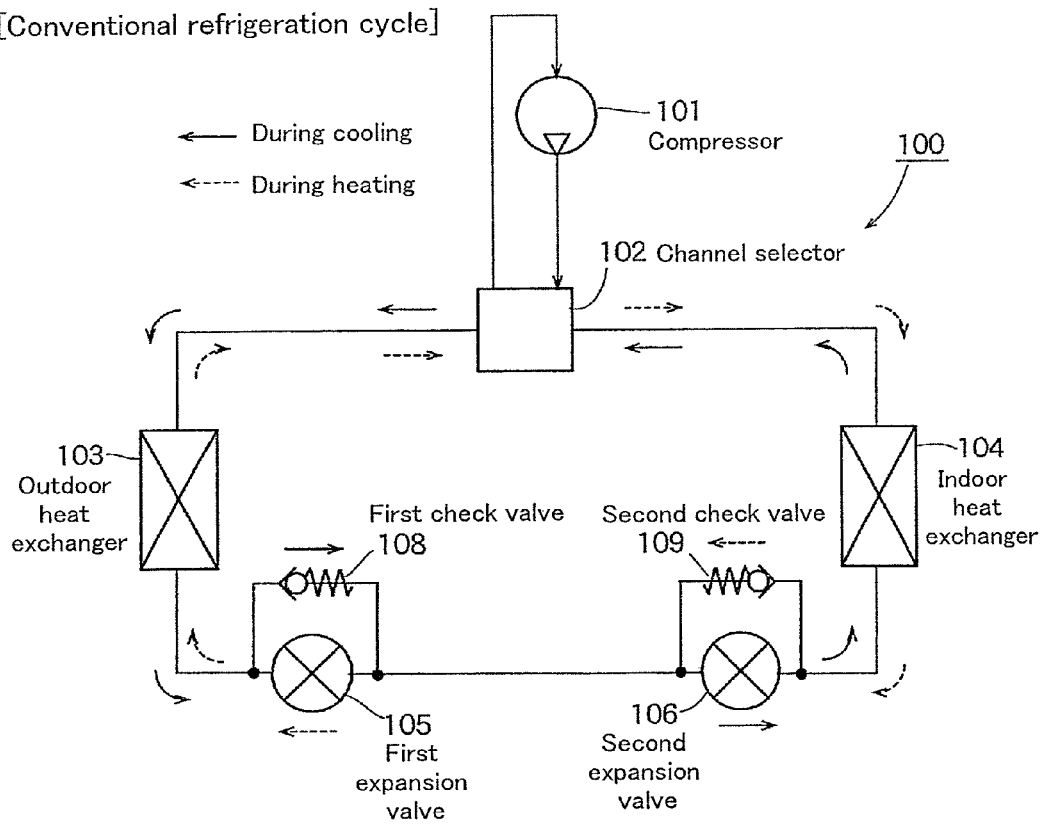
FIG. 6 shows an example of a conventional refrigeration cycle.

FIGS. 5(a) and 5(b) show a refrigeration cycle 100 in which in place of the first expansion valve 105 and the second expansion valve 106 in the refrigeration cycle 100 shown in FIG. 6, the motor-operated valves 10A and 10B of the above described first and second examples are incorporated in a predetermined mode as the first motor-operated valves 11 and 21, and the second motor-operated valves 12 and 22.

In this refrigeration cycle 100, it is configured such that during cooling when the refrigerant is made to flow from the outdoor heat exchanger 103 to the indoor heat exchanger 104, all or a majority of the refrigerant is made to flow without being passed through the orifice 22a to reduce pressure loss as much as possible at the first motor-operated valve 11, and is made to flow only from between the main valve body 24 and the orifice 22a to perform flow rate control at the second motor-operated valve 12; and during heating when the refrigerant is made to flow from the indoor heat exchanger 104 to the outdoor heat exchanger 103, all or a majority of the refrigerant is made to flow without being passed through the orifice 22a to reduce pressure loss as much as possible at the second motor-operated valve 12, and is made to flow only from between the main valve body 24 and the orifice 22a to perform flow rate control at the first motor-operated valve 11.

FIGS. 7(A) and 7(B), and FIGS. 8(C) and 8(D) are principal-part longitudinal sectional views of a third embodiment (a third example) of the motor-operated valve relating to the present invention. Here, since the basic configuration of the motor-operated valve 10C of the shown example is substantially the same as that of the motor-operated valve 10' of the above described conventional example shown in FIG. 9, portions corresponding to each part of the motor-operated valves 10' of the conventional example shown in FIG. 9 are given the same reference characters to omit overlapping of description, and hereafter description will be made with emphasis placed on the valve main body 20 portion which is a principal part (characteristic portion).

Figure 7:
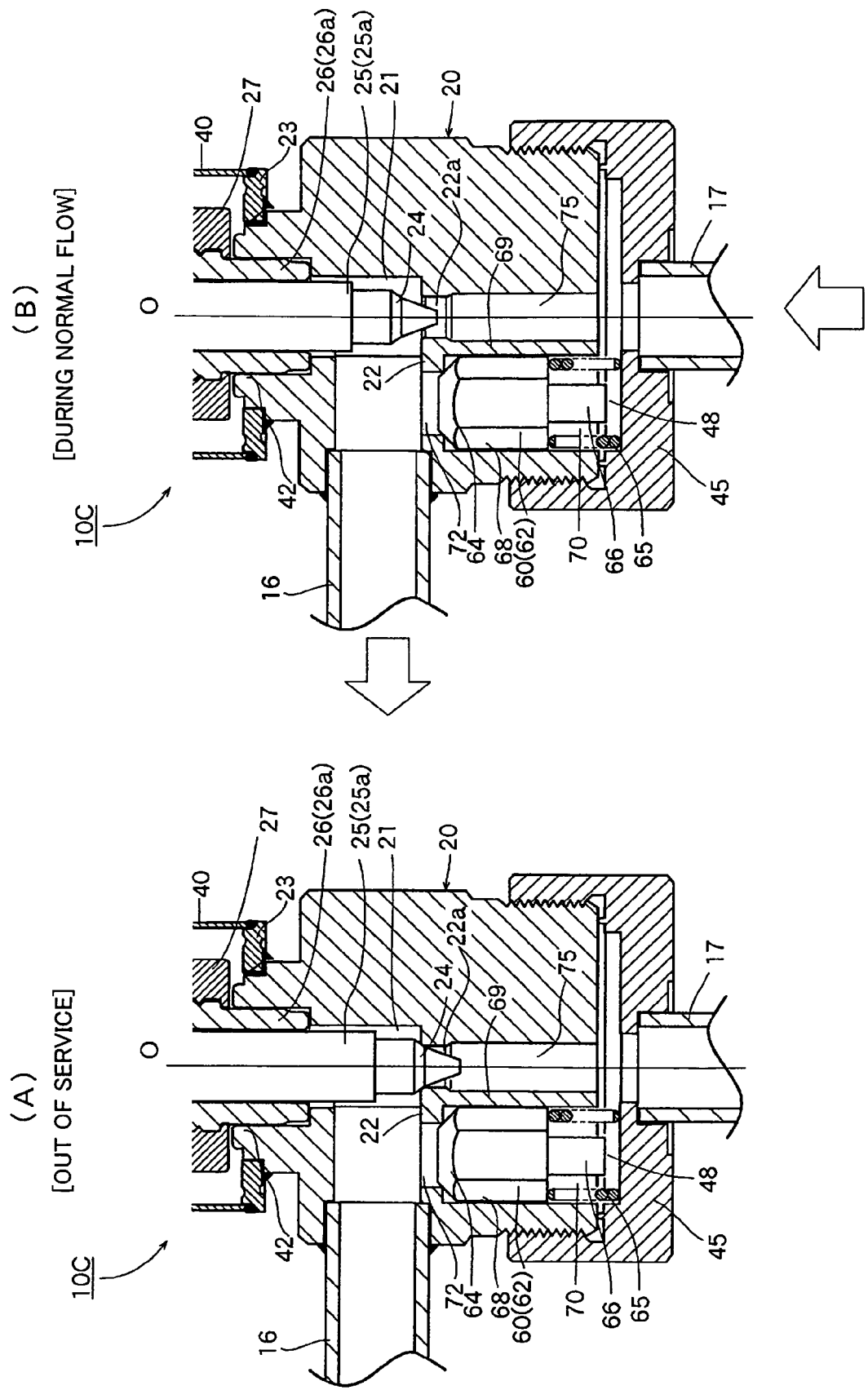
FIG. 7 is a principal-part longitudinal sectional view to be used for description of the configuration and operation of a third example of the motor-operated valve relating to the present invention.
Figure 8:
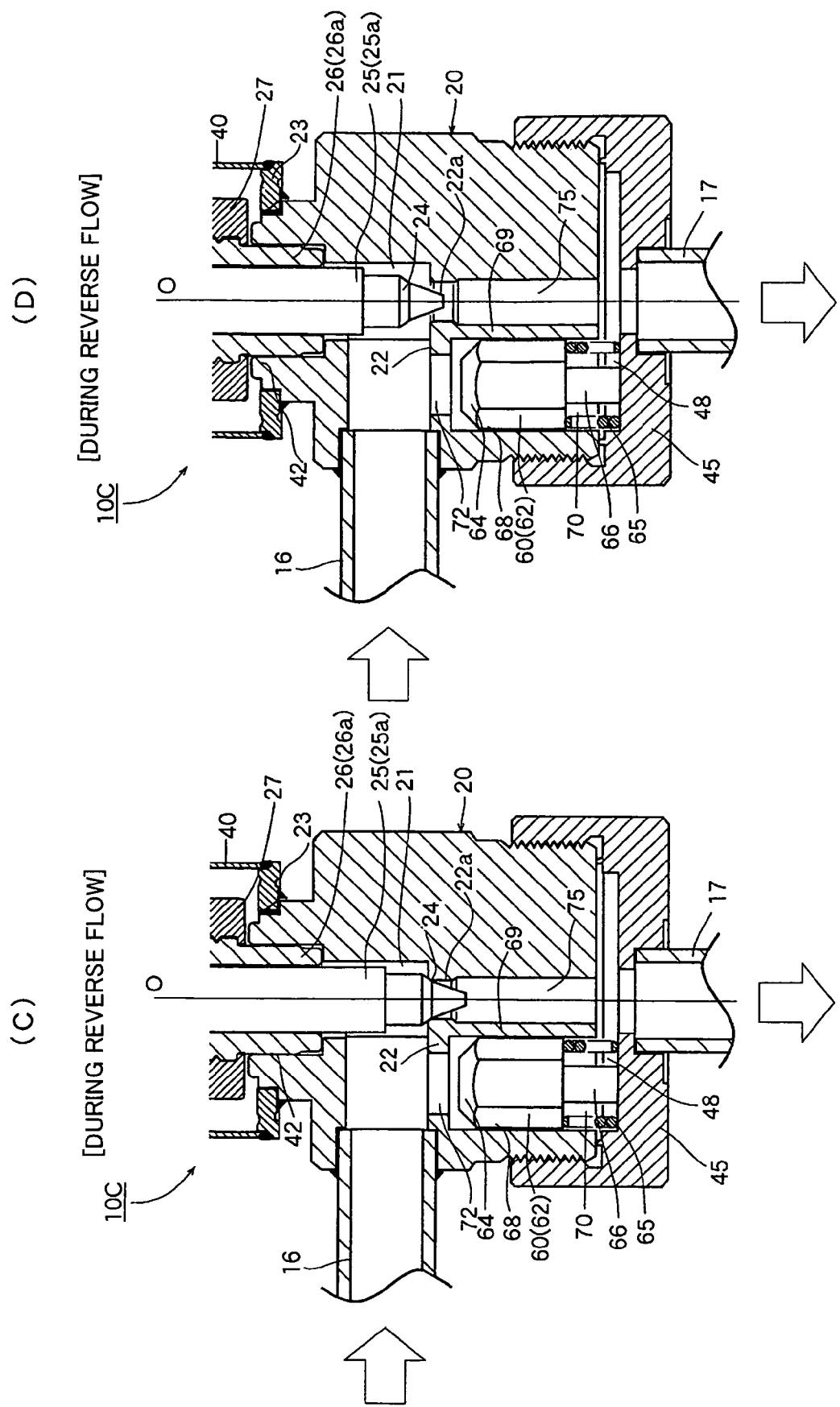
FIG. 8 is a principal-part longitudinal sectional view to be used for description of the configuration and operation of a third example of the motor-operated valve relating to the present invention.

The motor-operated valve 10C of the shown third example is configured such that during a normal flow as shown in FIG. 7(B), the refrigerant is made to flow only from between the main valve body 24 and the orifice 22a to perform flow rate control, and during a reverse flow as shown in FIGS. 8(C) and 8(D), all or a majority of the refrigerant is made to flow without being passed through the orifice 22a to decrease pressure loss as much as possible.

That is, a cap-type bottom member 45 is threaded to the lower part of the valve main body 20 and is sealed air-tightly, and a conduit 17 is jointed to the cap-type bottom member 45 so that a normal flow channel 75 which is in communication with the orifice 22a and coaxially therewith is formed between the cap-type bottom member 45 and the valve seat 22, and a valve-body housing part 68 defining a channel 70 which bypasses the orifice 22a in parallel with the normal flow channel 75 interposing a partition wall 69 is formed. The valve-body housing part 68 is in communication with the normal flow channel 75 and the conduit 17 through a space 48 formed between the cap-type bottom member 45 and the lower end of the valve main body 20.

A check valve body 60 which closes the bypass channel 70 during a normal flow and opens it during a reverse flow is provided in the valve-body housing part 68. The check valve body 60 is disposed at a position off-centered from the orifice 22a (rotational axis line "O") by a predetermined distance.

Specifically, the check valve body 60 includes a solid part 62 having a regular hexagonal sectional shape; in the upper surface of the solid part 62, a conical surface part 64 which opens/closes an opening part 72 making up a part of the bypass channel 70 provided in the valve seat 22 is formed, and in the lower side thereof, a column-like stopper 66 of a small diameter is provided and is slidably fitted into the valve-body housing part 68; and the bypass channel 70 is provided between the outer periphery surface of the check valve body 60 and the inner periphery surface of the valve-body housing part 68.

Moreover, a coil spring 65 which constantly urges the check valve body 60 in the direction to close the bypass channel 70 (the opening 72) is mounted in a compressed state between the cap-type bottom member 45 and the solid part 62.

In the motor-operated valve 10C of the present example which is configured as described above, during out of service as shown in FIG. 7(A), the orifice 22a is closed by the main valve body 24 (the lift amount is 0) and the bypass channel 70 is also closed by the check valve body 60.

During a normal flow, as shown in FIG. 7(B), the bypass channel 70 (the opening 72) is closed by the check valve body 60 and the main valve body 24 is lifted from the orifice 22a so that the refrigerant is introduced from the lower side conduit 17 into the valve main body 20 and is made to flow to the conduit 16 through between the main valve body 24 and the orifice 22a (with the flow being reduced).

Contrasting to that, during a reverse flow, as shown in FIG. 8(C), the orifice 22a is closed by the main valve body 24 and the check valve body 60 is pressed downwardly so that the bypass channel 70 is opened, and the refrigerant is made to flow from the conduit 16 to the conduit 17 through the bypass channel 70. During this reverse flow, it may be configured such that the main valve body 24 is lifted to a maximum level as shown in FIG. 8(D) so that a part of the refrigerant is made to flow through the orifice 22a.

Thus, in the motor-operated valve 10C of the present embodiment, since the channel 70 which bypasses the orifice 22a which is opened/closed by the main valve body 24 is formed, and the check valve body 60 which closes the bypass channel 70 during a normal flow and opens it during a reverse flow is provided at a position off-centered from the orifice 22a, so that during a normal flow, the refrigerant is made to flow only between the main valve body 24 and the orifice 22a, and during a reverse flow, all or a majority of the refrigerant is made to flow to the bypass channel 70 without being passed through the orifice 22a, it becomes possible to perform flow rate control at a high accuracy during a normal flow and to reduce pressure loss to the same level as that of a flow in a conduit during a reverse flow.

FIG. 5(a) shows a refrigeration cycle 100 in which in place of the first expansion valve 105 and the second expansion valve 106 in the refrigeration cycle 100 shown in FIG. 6, the motor-operated valve 10C of the above described third example is incorporated in a predetermined mode as the first motor-operated valve 11 and the second motor-operated valve 12.

In this refrigeration cycle 100, it is configured such that during cooling when the refrigerant is made to flow from the outdoor heat exchanger 103 to the indoor heat exchanger 104, all or a majority of the refrigerant is made to flow without being passed through the orifice 22a to reduce pressure loss as much as possible at the first motor-operated valve 11, and is made to flow only from between the main valve body 24 and the orifice 22a to perform flow rate control at the second motor-operated valve 12; and during heating when the refrigerant is made to flow from the indoor heat exchanger 104 to the outdoor heat exchanger 103, all or a majority of the refrigerant is made to flow without being passed through the orifice 22a to reduce pressure loss as much as possible at the second motor-operated valve 12, and is made to flow only from between the main valve body 24 and the orifice 22a to perform flow rate control at the first motor-operated valve 11.

Thus, by using the motor-operated valves 10A to 10C relating to the present invention for a refrigeration cycle in place of conventional expansion valves 105 and 106, it is possible to significantly improve the control accuracy in the refrigeration cycle and to reduce pressure loss as much as possible resulting in a significant increase in energy saving efficiency. Further, since there is no need of separately arranging and connecting a check valve for the piping as in conventional examples, it is possible to suppress man-hours and costs needed for piping to a low level.

What is claimed is:

1. A motor-operated valve, comprising:
   a main valve member;
   a valve main body which is provided with an orifice to be opened/closed by the main valve member, the valve main body having a bypass channel formed therein for bypassing the orifice;
   an up-and-down movement driving mechanism comprising a rotor and a stator for adjusting a lift amount of the main valve member with respect to the orifice;
   a normal-flow channel forming part including a normal-flow channel in communication with the orifice;
   a check valve member that closes the bypass channel in a first position during a normal flow and opens the bypass channel in a second position during a reverse flow, the check valve member being arranged coaxially with the orifice, the check valve member having a tubular form and being slidably fitted over an outer periphery of the normal-flow channel forming part such that the bypass channel is formed on an outer periphery side of the check valve member; and
   a spring member that constantly urges the check valve member to the first position to close the bypass channel, and
   wherein during the normal flow, fluid is made to flow only from between the main valve member and the orifice to perform flow rate control, and during the reverse flow, at least a majority of fluid is made to flow without being passed through the orifice to minimize pressure loss,
   wherein the bypass channel is configured to include a plurality of openings provided at the outer periphery side of the orifice in the valve main body, and
   wherein the plurality of openings are opened/closed by a flange-like part provided in the check valve member.

2. The motor-operated valve according to claim 1, wherein an orifice which is opened/closed by the main valve member is formed in the check valve member.

3. The motor-operated valve according to claim 2, wherein a guide part into which the check valve member is slidably inserted is provided in the valve main body.

4. The motor-operated valve according to claim 3, wherein an inlet/outlet port which is used both for a normal-flow outlet port and a reverse-flow inlet port is provided in the valve main body of each explanation valve, and during the normal flow for each expansion valve, the check valve member shuts off between the inlet/outlet port and the bypass channel.

5. The motor-operated valve according to claim 2, wherein an inlet/outlet port which is used both for a normal-flow outlet port and a reverse-flow inlet port is provided in the valve main body, and during the normal flow, the check valve member closes fluid communication between the inlet/outlet port and the bypass channel.

6. A refrigeration cycle, comprising:
   a compressor, a channel selector, an outdoor heat exchanger, and an indoor heat exchanger;
   a first expansion valve that is disposed proximite to the outdoor heat exchanger; and
   a second expansion valve that is disposed proximite to the indoor heat exchanger between the outdoor heat exchanger and the indoor heat exchanger, and
   wherein each of the first and second expansion valves is a motor-operated valve that respectively comprises:
   a main valve member;
   a valve main body which is provided with an orifice to be opened/closed by the main valve member, the valve main body having a bypass channel formed therein for bypassing the orifice;
   an up-and-down movement driving mechanism comprising a rotor and a stator for adjusting a lift amount of the main valve member with respect to the orifice;
   a normal-flow channel forming part including a normal-flow channel in communication with the orifice;
   a check valve member that closes the bypass channel in a first position during a normal flow and opens the bypass channel in a second position during a reverse flow, the check valve member being arranged coaxially with the orifice, the check valve member having a tubular form and being slidably fitted over an outer periphery of the normal-flow channel forming part such that the bypass channel is formed on an outer periphery side of the check valve member; and a spring member that constantly urges the check valve member to the first position to close the bypass channel, and wherein during the normal flow, fluid is made to flow only from between the main valve member and the orifice to perform flow rate control, and during the reverse flow, at least a majority of fluid is made to flow without being passed through the orifice to minimize pressure loss, wherein the bypass channel is configured to include a plurality of openings provided at the outer periphery side of the orifice in the valve main body, and wherein the plurality of openings are opened/closed by a flange-like part provided in the check valve member, wherein the refrigeration cycle being configured such that, when the refrigerant flows from the outdoor heat exchanger to the indoor heat exchanger, at least a majority of the refrigerant is made to flow without being passed through the orifice at the first expansion valve to minimize pressure loss, and is made to flow only from between the main valve member and the orifice at the second expansion valve to perform flow rate control, and wherein, when the refrigerant is made to flow from the indoor heat exchanger to the outdoor heat exchanger, at least a majority of the refrigerant is made to flow without being passed through the orifice at the second expansion valve to minimize pressure loss, and is made to flow only from between the main valve member and the orifice at the first expansion valve to perform flow rate control.

* * * * *

UNITED STATES PATENT AND TRADEMARK OFFICE
CERTIFICATE OF CORRECTION

| | | |
|---|---|---|
| PATENT NO. | : 8,763,419 B2 | Page 1 of 1 |
| APPLICATION NO. | : 12/662354 | |
| DATED | : July 1, 2014 | |
| INVENTOR(S) | : Suganuma | |

It is certified that error appears in the above-identified patent and that said Letters Patent is hereby corrected as shown below:

On the Title Page

Column 1, under Item (75) Inventor:

Please delete
"Suganama"

Please add
--Suganuma--

Signed and Sealed this
Third Day of March, 2015

Michelle K. Lee
*Deputy Director of the United States Patent and Trademark Office*